(12) United States Patent
Dusad et al.

(10) Patent No.: US 11,489,885 B2
(45) Date of Patent: Nov. 1, 2022

(54) SYSTEM AND METHOD FOR UPDATING PARTICIPANTS IN PARALLEL OVERLAPPING CONFERENCES

(71) Applicant: Avaya Inc., Basking Ridge, NJ (US)

(72) Inventors: Manish Dusad, Pune (IN); Charu Brahme, Pune (IN)

(73) Assignee: Avaya, Inc., Basking Ridge, NJ (US)

( * ) Notice: Subject to any disclaimer, the term of this patent is extended or adjusted under 35 U.S.C. 154(b) by 1060 days.

(21) Appl. No.: 15/365,007

(22) Filed: Nov. 30, 2016

(65) Prior Publication Data

US 2018/0152488 A1  May 31, 2018

(51) Int. Cl.
*H04L 65/1083* (2022.01)
*H04L 65/403* (2022.01)
*H04L 12/18* (2006.01)

(52) U.S. Cl.
CPC ...... *H04L 65/1086* (2013.01); *H04L 12/1818* (2013.01); *H04L 12/1822* (2013.01); *H04L 65/1083* (2013.01); *H04L 65/403* (2013.01)

(58) Field of Classification Search
CPC ............. H04L 65/1086; H04L 65/1083; H04L 65/403; H04L 12/1818; H04L 12/1822
USPC .......................................... 709/203–206, 217
See application file for complete search history.

(56) References Cited

U.S. PATENT DOCUMENTS

| | | | |
|---|---|---|---|
| 5,949,414 A * | 9/1999 | Namikata | G06F 3/0481 715/753 |
| 9,055,192 B1 * | 6/2015 | Mallappa | H04N 7/155 |
| 2007/0133438 A1 * | 6/2007 | Shaffer | H04L 12/1813 370/260 |
| 2009/0013045 A1 * | 1/2009 | Maes | G06Q 10/10 709/205 |
| 2012/0011205 A1 * | 1/2012 | Paulsami | G06Q 10/1095 709/206 |
| 2012/0163576 A1 * | 6/2012 | Bentley | H04M 3/563 379/202.01 |
| 2013/0254279 A1 * | 9/2013 | Bentley | G06F 16/9535 709/204 |
| 2013/0290870 A1 * | 10/2013 | Jones | H04L 12/1822 715/753 |
| 2014/0229219 A1 * | 8/2014 | Hiller | G06Q 10/06 705/7.19 |
| 2014/0289326 A1 * | 9/2014 | McCormack | H04L 65/1006 709/204 |
| 2017/0310826 A1 * | 10/2017 | Gunasekar | H04L 12/1827 |

* cited by examiner

*Primary Examiner* — Joshua Joo
*Assistant Examiner* — Melaku Y Habtemariam

(57) ABSTRACT

Examples disclosed herein provide methods and systems for updating participants in parallel ongoing conferences through a central conference call management system. In at least one implementation, a method of operating a conference call management system is provided. The method includes monitoring an ongoing first conference call, and receiving a request from one or more users for a second conference call to utilize at least some of the same resources as the first conference call. The method also includes determining an estimated time remaining for the first conference call by analyzing at least some content of the first conference call, and providing the estimated time remaining for the first conference call to the one or more users.

19 Claims, 4 Drawing Sheets

SYSTEM AND METHOD FOR UPDATING PARTICIPANTS IN PARALLEL OVERLAPPING CONFERENCES

TECHNICAL BACKGROUND

Audio and video conferencing systems frequently use common systems and other equipment which is shared among a large number of users through a scheduling system. For example, a first group of users may schedule a first video conference at a particular time, while a second group of users schedules a second video conference immediately following the first video conference using at least some subset of the same equipment.

Since these conferences are typically geographically remote, different subsets of conferencing equipment is in frequent use by widely different groups of users throughout a typical day. Occasionally, important conferences will need more time than they have scheduled to complete their agenda. In this case, later conferences must be delayed or re-scheduled to accommodate the earlier, importance conference.

Overview

Examples disclosed herein provide systems and methods for updating participants in parallel ongoing conferences through a central conference call management system. In one implementation, a method of operating a conference call management system includes, monitoring an ongoing first conference call, and receiving a request from one or more users for a second conference call to utilize at least some of the same resources as the first conference call. The method also includes determining an estimated time remaining for the first conference call by analyzing at least some content of the first conference call, and providing the estimated time remaining for the first conference call to the one or more users.

In another implementation, a conference call management system includes an input port for receiving communications from a plurality of end users, an output port for transferring communications to the plurality of end users, and a processing system coupled with the input port and the output port.

The processing system is configured to monitor an ongoing first conference call among a first group of the plurality of end users through the input port, and to receive a request through the input port from one or more users among a second group of the plurality of end users for a second conference call to utilize at least some of the same resources as the first conference call.

The processing system is also configured to determine an estimated time remaining for the first conference call by analyzing at least some content of the first conference call, and to provide the estimated time remaining for the first conference call to the one or more users among the second group of users through the output port.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
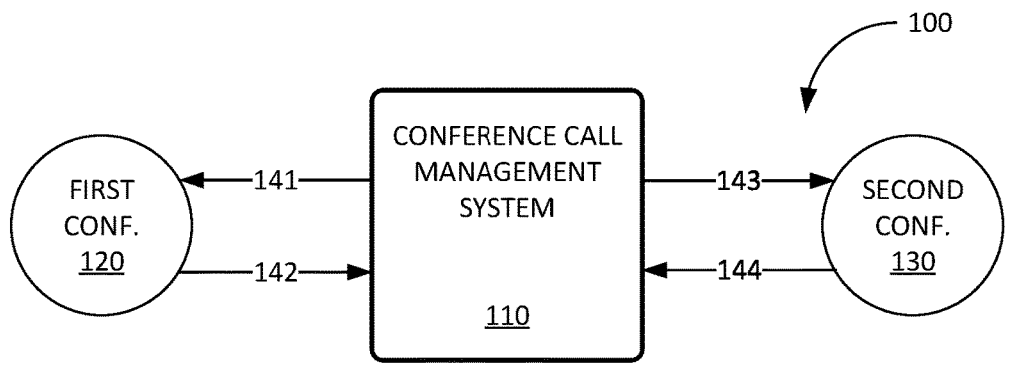
FIG. 1 illustrates a communication system for updating participants in parallel ongoing conferences through a central conference call management system according to one implementation.

FIG. 1 illustrates a communication system 100 for updating participants in parallel ongoing conferences through a central conference call management system 110 according to one implementation. Here, conference call management system 110 monitors first conference call 120 through communication link 142, and transmits data and audio to first conference call 120 through communication link 141. Likewise, conference call management system 110 monitors second conference call 130 through communication link 144, and transmits data and audio to second conference call 130 through communication link 143.

Each conference call may have any number of individual participants at any number of physical locations. In operation, user devices within each conference call connect to conference call management system 110 to provide desired conference call services for users of the user devices. These conference calls may include wired or wireless telephony for voice calls and video calls, including internet telephony, as well as instant messaging. To configure and manage the communications, conference call management system 110 is provided to setup and configure conference calls between end users over links 141-144. In particular, conference call management system 110 may be contacted by one or more users when a conference is required, and conference call management system 110 configures and manages the desired conference call.

In this example implementation, when first conference call 120 runs overtime and second conference call 130 is scheduled to begin, conference call management system 110 provides an estimated time remaining in first conference call 102 to members of second conference call 130. Methods and systems for determining this estimated time remaining and providing the estimated time to members of second conference call 130 are discussed in detail below.

Figure 2:
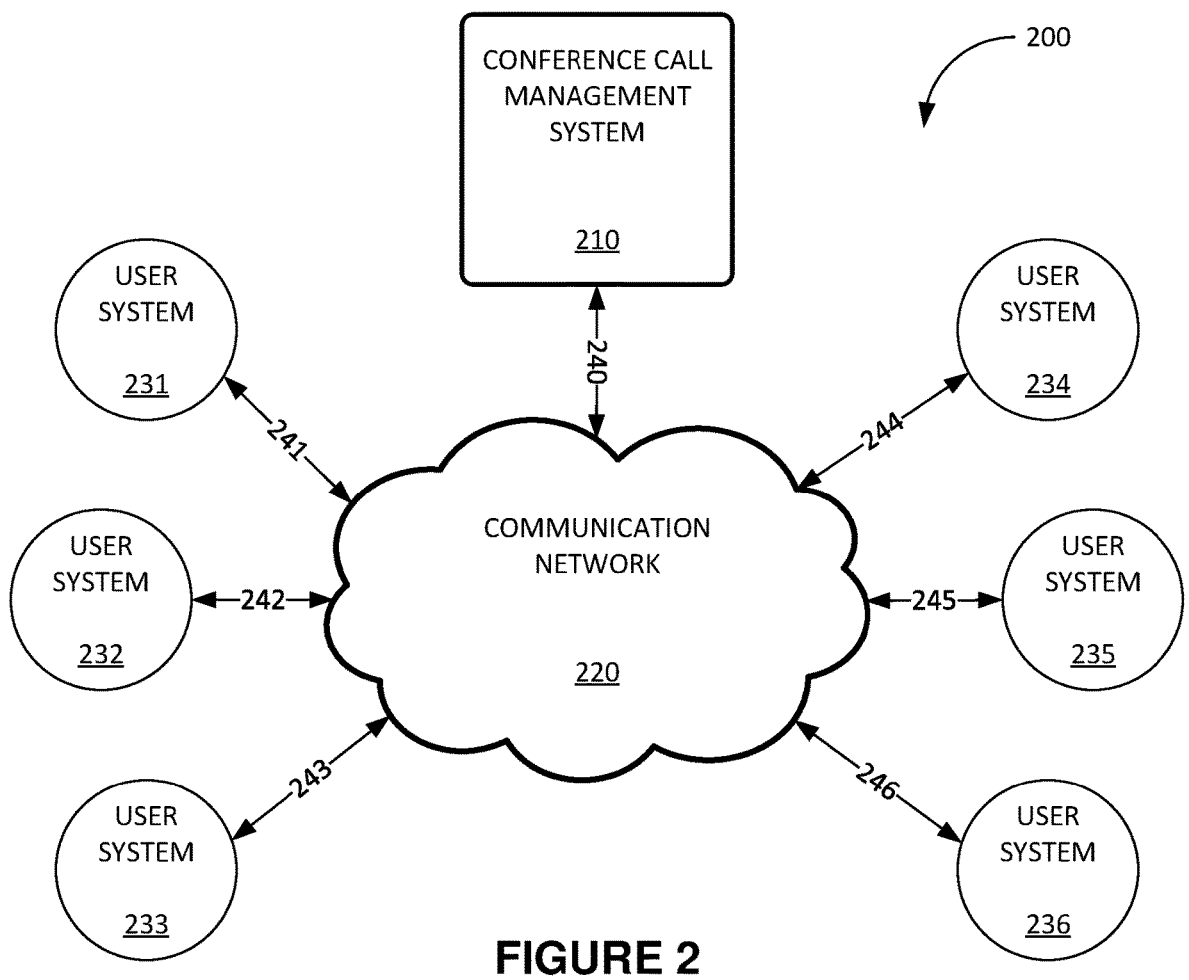
FIG. 2 illustrates a communication system for updating participants in parallel ongoing conferences through a central conference call management system according to another implementation.

FIG. 2 illustrates a communication system 200 for updating participants in parallel ongoing conferences through a central conference call management system 210 according to another example implementation.

Communication system 200 includes conference call management system 210, user systems 231-236, and communication network 220. Conference call management system 210 and user systems 231-236 communicate with communication network 220 over communication links 240-246.

Conference call management system 210 comprises a computer processor system and communication interface. Conference call management system 210 may also include other components such as a router, server, data storage system, and power supply. Conference call management system 210 may reside in a single device or may be distributed across multiple devices. While shown separately, conference call management system 210 may be incorporated into one or more of user systems. Conference call management system 210 may be an audio communication server, video communication server, application server, personal computer workstation, network gateway system, or some other computing system—including combinations thereof.

User systems 231-236 each comprise a computer processor system and a communication interface. User systems 231-236 may further include at least one microphone or may be operatively coupled to at least one microphone for capturing audio. User systems 231-236 may also include other components such as a router, server, data storage system, and power supply. User systems 231-236 may each reside in a single device or may be distributed across multiple devices. User systems 231-236 may be a telephone, computer, tablet, conference room system, e-book, mobile Internet appliance, network interface card, media player, game console, application server, proxy server, or some other communication apparatus—including combinations thereof.

Communication links 240-246 use metal, glass, air, space, or some other material as the transport media. Communication links 240-246 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. Communication links 240-246 could be direct links or may include intermediate networks, systems, or devices.

Communication network 220 comprises network elements that provide communications services to user systems 231-236 and conference call management system 210. Communication network 220 may comprise switches, wireless access nodes, Internet routers, network gateways, application servers, computer systems, communication links, or some other type of communication equipment—including combinations thereof. Communication network 220 may be a single network, such as a local area network, a wide area network, or the Internet, or may be a combination of multiple networks.

Figure 3:
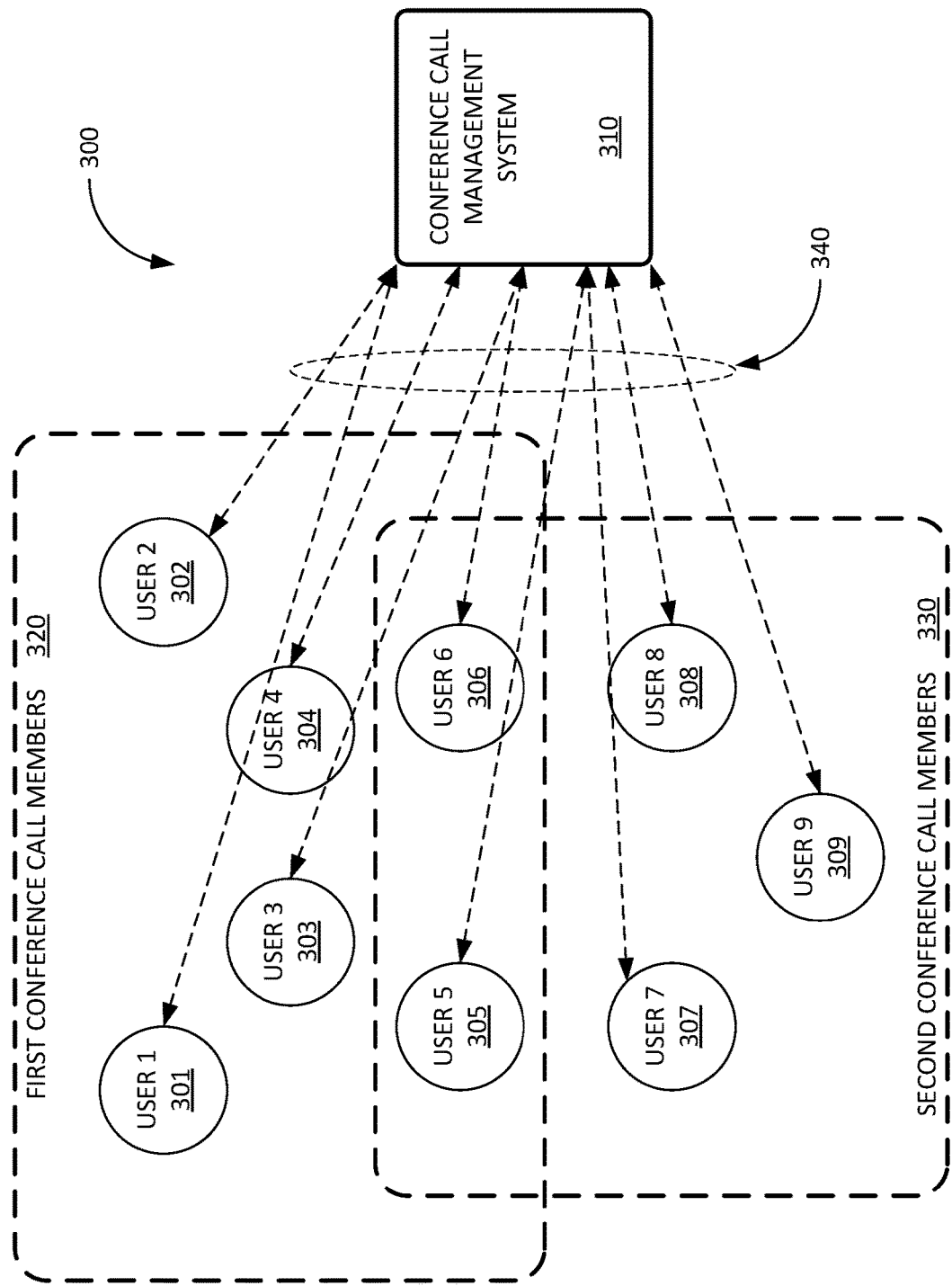
FIG. 3 illustrates a communication system for updating participants in parallel ongoing conferences through a central conference call management system according to a further implementation.

FIG. 3 illustrates a communication system 300 for updating participants in parallel ongoing conferences through a central conference call management system 310 according to a further implementation. Communication system 300 includes end user devices 301-309, coupled with conference call management system 310 through a plurality of communication links 340.

These communication links 340 may use the Internet or other global communication networks as described above with respect to FIG. 2. Communication links 340 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), IEEE 802.11 WiFi, Bluetooth, Personal Area Networks (PANs), Wide Area Networks, (WANs), Local Area Networks (LANs), or Wireless Local Area Networks (WLANs), including combinations, variations, and improvements thereof. Communication links 340 could be direct links or may include intermediate networks, systems, or devices.

Additionally, communication links 340 can include one or more wired portions which can comprise synchronous optical networking (SONET), hybrid fiber-coax (HFC), Time Division Multiplex (TDM), asynchronous transfer mode (ATM), circuit-switched, communication signaling, or some other communication signaling, including combinations, variations or improvements thereof. Communication links 340 can each use metal, glass, optical, air, space, or some other material as the transport media. Communication links 340 may include a logical network link transported over multiple physical links.

In operation, user devices 301-309 connect to conference call management system 310 to provide desired conference call services for users of user devices 301-309. These conference calls may include wired or wireless telephony for voice calls and video calls, including internet telephony, as well as instant messaging. To configure and manage the communications, conference call management system 310 is provided to setup and configure conference calls between end users over links 340. In particular, conference call management system 310 may be contacted by one or more users of user devices 301-309 when a conference is required, and conference call management system 310 configures and manages the desired conference call.

In this example implementation, users 1-6 of user devices 301-306 are members of first conference call 320, while users 5-9 of user devices 305-309 are members of second conference call 330. In the examples that follow, one or more of the users may be designated as a moderator of one or both of the conference calls.

In other examples, a single user may schedule consecutive calls with two different groups of users. For example, a manager who has multiple groups reporting to them may schedule a first conference call with one of the groups and a second conference call with a different group. In this example, the manager may act as a moderator for both conference calls, while the remaining users do not attend both calls.

Figure 4:
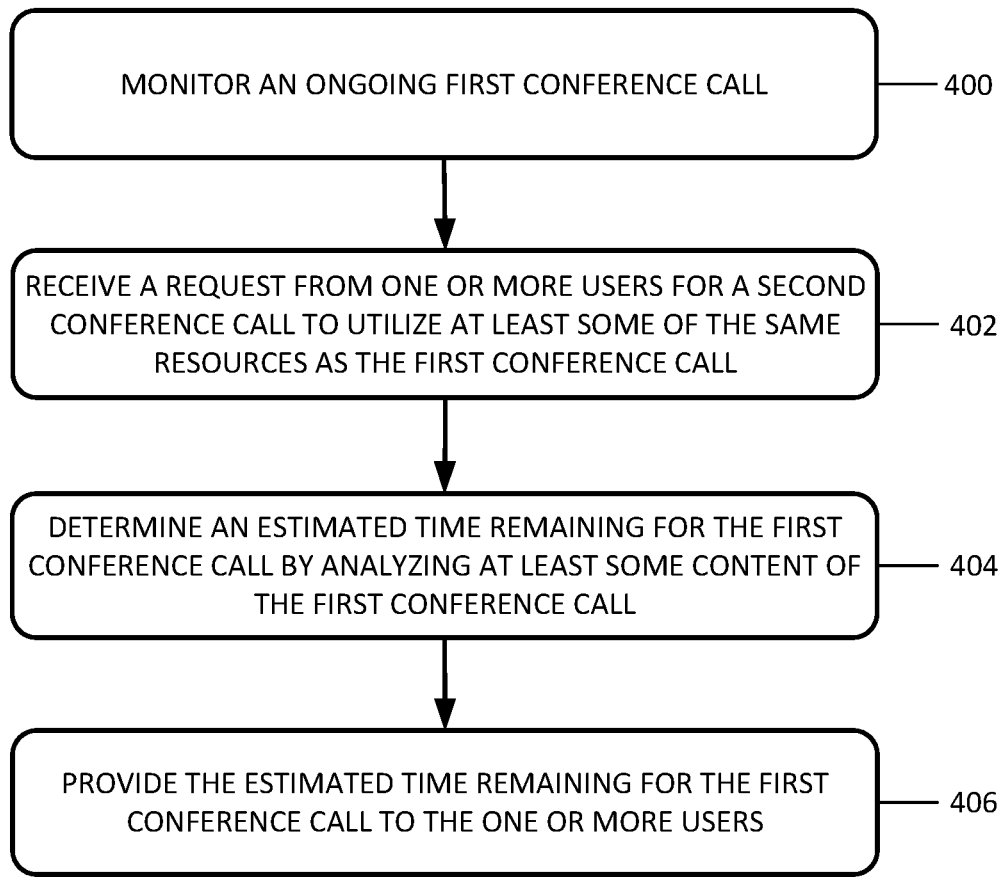
FIG. 4 illustrates a method of updating participants in parallel ongoing conferences through a central conference call management system according to one implementation.

FIG. 4 illustrates a method for operating conference call management system 310 as illustrated in FIG. 3. The operations of FIG. 4 are referenced parenthetically in the paragraphs that follow, along with references to the elements and systems from communication system 300 of FIG. 3.

In an example implementation, conference call management system 310 monitors an ongoing first conference call comprising first conference call members 320, (operation 400). Conference call management system then receives a request from one or more users (from second conference call members 330) for a second conference call to utilize at least some of the same resources as the ongoing first conference call, (operation 402).

Since the first conference call is still ongoing, the second conference call cannot be started until the first conference call is finished. Conference call management system 310 determines an estimated time remaining for the first conference call by analyzing at least some content of the first conference call, (operation 404).

The content of the first conference call analyzed by conference call management system 310 may vary according to the type of conference call (audio/video or audio only), the participants in the conference call, the systems and equipment used in the conference call, the date and time of the conference call, and the like. For example, conference call management system 310 may monitor the ongoing first conference call for certain keywords (either voice or message) such as "concluding", "summarizing", "re-scheduling", "next meeting", and the like, and determine an estimated time remaining based on these keywords.

In other cases, conference call management system 310 may notify a moderator of the first conference call that a second call is waiting, and optionally request an estimated time remaining in the first conference call from the moderator. If a presentation (such as a series of slides) is in progress, conference call management system 310 may determine how much of the presentation is remaining to be presented and estimate the time remaining based on the status of the presentation.

Once conference call management system 310 determines an estimated time remaining in the first conference call, it provides this estimated time to the one or more users waiting for the second conference call to begin, (operation 406). Optionally, conference call management system 310 may periodically update the estimated time remaining for the first conference call and provide the updated estimated time remaining in the first conference call to the one or more users waiting for the second conference call to begin.

In other implementations, conference call management system 310 may check the passcodes used for the first and second conference calls, and only update the one or more users waiting for the second conference call if the passcodes are the same.

Optionally, conference call management system 310 may configure and start a new conference call for the one or more users waiting for the second conference call to begin. In the case where the moderator of the first conference call is the moderator of the second conference call, conference call management system 310 may execute an auto-moderator software module to temporarily act as moderator of the second conference call until the end of the first conference call. Optionally, conference call management system 310 may query the moderator of the first conference call to see if they wish to start the second conference call in auto-moderator mode. In other implementations, conference call management system 310 may query the moderator of the first conference call to select one of the members of the second conference call to temporarily act as moderator of the second conference call until the end of the first conference call.

In still another implementation, conference call management system 310 may provide a moderator of the first conference call the opportunity to share some of the audio or video of the ongoing first conference call to members of the second conference call. For example, the moderator may choose to share video of an ongoing presentation within the first conference call (with or without audio) to members of the second conference call while they are waiting.

In cases where some users are members of both conference calls, such as users 5 and 6 (305 and 306) of FIG. 3, and a second conference call has been initiated, conference call management system 310 may provide these users the opportunity to seamlessly switch between the two parallel conference calls as they desire.

Optionally, conference call management system 310 may provide members of the second conference call an opportunity to re-schedule their call, either as a decision by a moderator of the second conference call, or by polling members of the second conference call. Conference call management system 310 then notifies the expected members of the second conference call of the re-scheduled conference.

Figure 5:
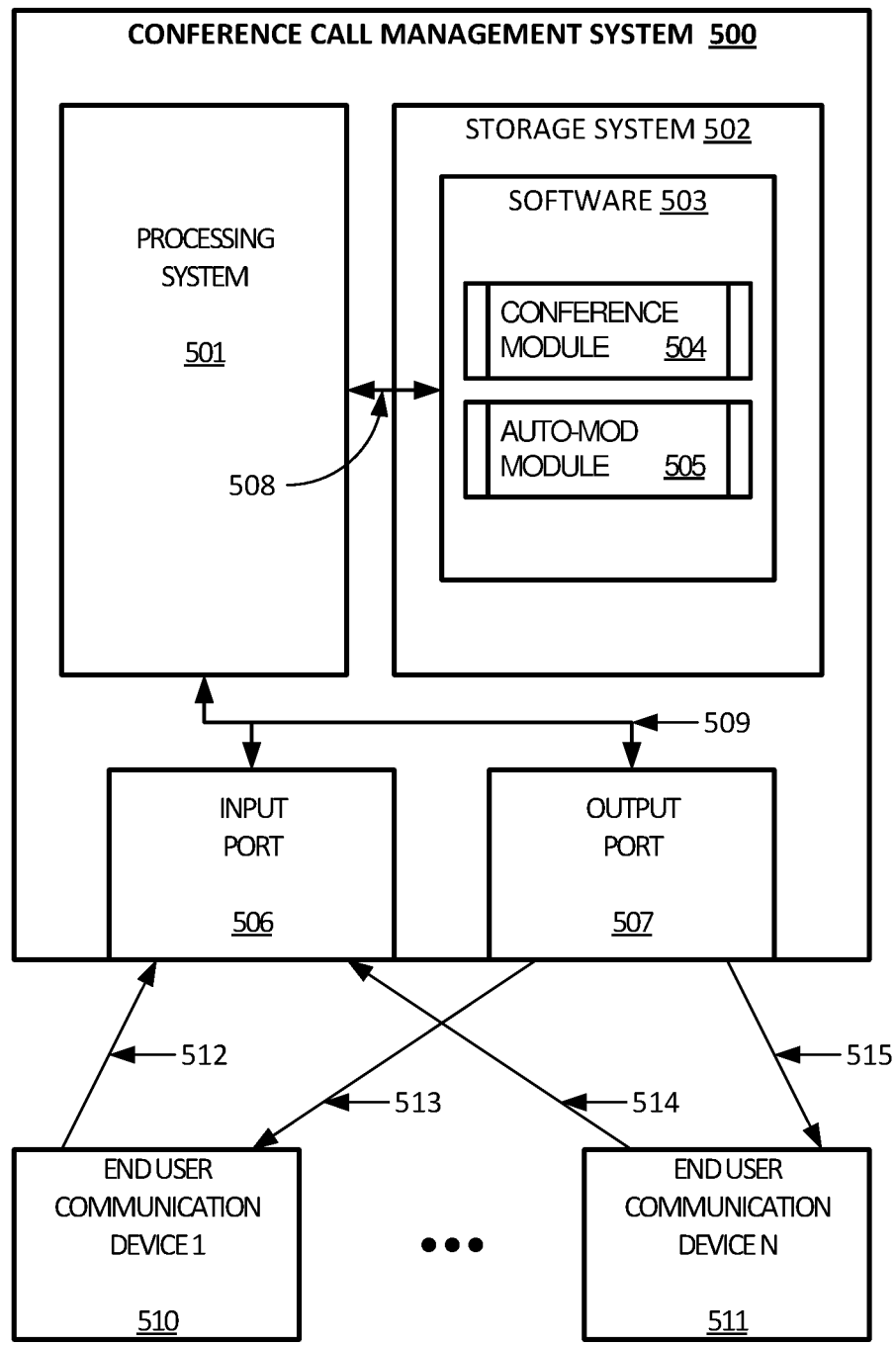
FIG. 5 illustrates a conference call management system configured to update participants in parallel ongoing conferences according to one implementation.

FIG. 5 illustrates conference call management system 500. Conference call management system 500 is an example of a computing environment that can execute features of conference call management system 310 of FIG. 3. Furthermore, elements of conference call management system 500 can be distributed over one or more computing devices.

Conference call management system 500 includes processing system 501, storage system 502, software 503, input port 506, and output port 507. Processing system 501 communicates with storage system 502 and software 503 through data bus 508. Processing system 501 communicates with input port 506 and output port 507 through data bus 509.

It may be understood that conference call management system 500 is generally intended to represent a computing system or systems on which software 503 may be deployed and executed in order to implement conference call management system 310. However, conference call management system 500 may also be suitable as any computing system on which software 503 may be staged and from where one or both may be distributed, transported, downloaded, or otherwise provided to yet another computing system for deployment and execution, or yet additional distribution.

Input port 506 and output port 507 may include communication connections and devices that allow for communication with end user communication devices (510 and 511), and with other computing systems over a communication network or various communication links. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

Communication between conference call management system 500 and any other communication device or computing system may occur over a communication network or networks and in accordance with various communication protocols, combinations of protocols, or variations thereof. Examples of such communication networks include intranets, internets, the Internet, local area networks, wide area networks, wireless networks, wired networks, virtual networks, software defined networks, data center buses, computing backplanes, or any other type of network, combination of network, or variation thereof. Some communication protocols that may be used include, but are not limited to, the Internet protocol (IP, IPv4, IPv6), the transfer control protocol (TCP), and the user datagram protocol (UDP), as well as any other suitable communication protocol, variation, or combination thereof.

Processing system 501 can comprise one or more microprocessors and other processing circuitry that retrieves and executes software 503 from storage system 502. Processing system 501 can be implemented within a single processing device but can also be distributed across multiple processing devices or sub-systems that cooperate in executing program instructions. Examples of processing system 501 include general purpose central processing units, application specific processors, and logic devices, as well as any other type of processing device, combinations, or variations thereof. In some examples, portions of processing system 501 is physically separate from some elements of conference call management system 500 and area included in remote servers, cloud-based processing systems, or virtualized computing systems.

Storage system 502 can comprise any non-transitory computer readable storage media capable of storing software 503 that is executable by processing system 501. Storage system 502 can also include various data structures which comprise one or more databases, tables, lists, or other data structures. Storage system 502 can include volatile and nonvolatile, removable and non-removable media implemented in any method or technology for storage of information, such as computer readable instructions, data structures, program modules, or other data. Storage system 502 can be implemented as a single storage device but can also be implemented across multiple storage devices or sub-systems co-located or distributed relative to each other. Storage system 502 can comprise additional elements, such as a controller, capable of communicating with processing system 501. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 503 can be implemented in program instructions and among other functions can, when executed by conference call management system 500 in general or processing system 501 in particular, direct conference call management system 500, or processing system 501 to operate as described herein for a remote management system or other functional systems. Software 503 can include additional processes, programs, or components, such as operating system software, database software, or application software. Software 503 can also comprise firmware or some other form of machine-readable processing instructions executable by elements of processing system 501.

In at least one implementation, the program instructions can include conference call module 504 and auto-moderator module 505. Conference call module 504 configures and manages conference calls among a plurality of end user communication devices such as end user communication device 1 (510) through end user communication device N (511). Conference call module 504 also monitors conference calls as described above. Conference call module 504 directs processing system 501 in the use of input port 506 and output port 507 in the receipt and transmission (respectively) of communications from end user communication device 1 (510) through end user communication device N (511) through communication links 512-515.

Auto-moderator module 505 implements and manages an auto-moderator for use in the second conference call as described above when a moderator is unavailable for the second conference call.

In general, software 503 can, when loaded into processing system 501 and executed, transform processing system 501 overall from a general-purpose computing system into a special-purpose computing system customized to operate as described herein for a conference call management system, communication node, among other operations. Encoding software 503 on storage system 502 can transform the physical structure of storage system 502. The specific transformation of the physical structure can depend on various factors in different implementations of this description. Examples of such factors can include, but are not limited to the technology used to implement the storage media of storage system 502 and whether the computer-storage media are characterized as primary or secondary storage. For example, if the computer-storage media are implemented as semiconductor-based memory, software 503 can transform the physical state of the semiconductor memory when the program is encoded therein. For example, software 503 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a conference call management system comprising:
   monitoring an ongoing first conference call;
   during the first conference call, receiving a request from one or more users, which are not members of the first conference call, to start a second conference call to utilize at least some of the same resources as the first conference call;
   determining an estimated time remaining for the first conference call by analyzing at least some content of the first conference call;
   determining if a first passcode for the first conference call is identical to a second passcode for the second conference call; and
   in response to the request, providing the estimated time remaining for the first conference call to the one or more users only if the first passcode and the second passcode are identical.

2. The method of claim 1, wherein analyzing at least some content of the first conference call includes identifying an ongoing presentation within the first conference call and determining an amount remaining in the ongoing presentation.

3. The method of claim 1, wherein analyzing at least some content of the first conference call includes detecting keywords within the at least some content of the first conference call.

4. The method of claim 1, further comprising:
notifying a moderator for the first conference call of the request for the second conference call.

5. The method of claim 1, further comprising:
sending a query to a moderator for the estimate of the time remaining for the first conference call.

6. The method of claim 1, further comprising:
sending a query to a moderator for permission to share at least some of the first conference call with participants to the second conference call; and
in response to receiving permission from the moderator, sharing the at least some of the first conference call with participants to the second conference call.

7. The method of claim 1, further comprising:
periodically updating the estimated time remaining for the first conference call to the one or more users.

8. The method of claim 1, further comprimising:
providing the one or more users an option to re-schedule the second conference call; and
sending notice of the re-scheduled second conference call to expected participants of the second conference call.

9. The method of claim 1, further comprising:
polling the one or more users to determine if a majority would prefer to re-schedule the second conference call; and
sending notice of the re-scheduled second conference call to expected participants of the second conference call if the majority would prefer to re-schedule the second conference call.

10. The method of claim 1, further comprising:
starting the second conference call in parallel with the first conference call.

11. The method of claim 10, further comprising:
determining one or more users who are participants in both the first and second conference calls; and
providing the one or more users who are participants in both the first and second conference calls an ability to switch between the first and second conference calls.

12. The method of claim 10, further comprising:
running the second conference call in an auto-moderator mode until a moderator for the second conference call is in attendance.

13. The method of claim 10, further comprising:
providing a moderator of the first conference call with an ability to select a moderator for the second conference call.

14. A conference call management system for directing conference calls comprising:
an input port for receiving communications from a plurality of end users;
an output port for transferring communications to the plurality of end users; and
a processing system coupled with the input port and the output port, and configured to:
monitor an ongoing first conference call among a first group of the plurality of end users through the input port;
receive a request through the input port from one or more users among a second group of the plurality of end users, and not among the first group of the plurality of end users, to start a second conference call to utilize at least some of the same resources as the first conference call;
determine an estimated time remaining for the first conference call by analyzing at least some content of the first conference call;
determine if a first passcode for the first conference call is identical to a second passcode for the second conference call; and
in response to the request, provide the estimated time remaining for the first conference call to the one or more users among the second group of the plurality of end users through the output port only if the first passcode and the second passcode are identical.

15. The conference call management system of claim 14, wherein analyzing at least some content of the first conference call includes identifying an ongoing presentation within the first conference call and determining an amount remaining in the ongoing presentation.

16. The conference call management system of claim 14, wherein analyzing at least some content of the first conference call includes detecting keywords within the content of the first conference call.

17. The conference call management system of claim 14, wherein the processing system is further configured to:
send a query to a moderator for permission to share at least some of the first conference call with participants to the second conference call; and
in response to receiving permission from the moderator, share the at least some of the first conference call with the one or more users among the second group of the plurality of end users.

18. The conference call management system of claim 14, wherein the processing system is further configured to:
provide the one or more users among second group of the plurality of end users an option to re-schedule the second conference call; and
send notice of the re-scheduled second conference call to the second group of the plurality of end users.

19. The conference call management system of claim 14, wherein the processing system is further configured to:
poll the one or more users among the second group of the plurality of end users to determine if a majority would prefer to re-schedule the second conference call; and
send notice of the re-scheduled second conference call to the second group of the plurality of end users if the majority would prefer to re-schedule the second conference call.

* * * * *